United States Patent

[11] 3,622,994

[72] Inventor Frank H. W. Schoenwitz
Arlington Heights, Ill.
[21] Appl. No. 10,501
[22] Filed Feb. 11, 1970
[45] Patented Nov. 23, 1971
[73] Assignee Honeywell Inc.
Minneapolis, Minn.

[54] CONTROL AND SUPERVISION SYSTEM HAVING DATA STORAGE
10 Claims, 6 Drawing Figs.

[52] U.S. Cl. .......... 340/152, 340/151, 340/163
[51] Int. Cl. .......... H04q 5/00, H04q 11/00
[50] Field of Search .......... 340/151, 152, 163

[56] References Cited

UNITED STATES PATENTS

| | | | |
|---|---|---|---|
| 3,181,121 | 4/1965 | Losch .......... | 340/152 X |
| 3,230,509 | 1/1966 | Spencer .......... | 340/152 X |
| 3,345,612 | 10/1967 | Goldman .......... | 340/152 X |
| 3,516,063 | 6/1970 | Arkin et al. .......... | 340/151 X |
| 3,551,885 | 12/1970 | Henzel .......... | 340/163 |

*Primary Examiner*—Harold I. Pitts
*Attorneys*—Lamont B. Koontz and Clyde C. Blinn

ABSTRACT: A control and supervision system for controlling and supervising the operation of a building air-conditioning system. A central station and a plurality of remote stations connected by a communication channel, wherein the central station has data associated with the remote stations stored in a memory. As messages are received from the remote station, a portion of the message can selectively operate the memory apparatus to obtain information from the memory associated with the particular station from which the message originated.

ANALOG DATA WORD FROM GROUP I STATION 2

INVENTOR:
FRANK H. W. SCHOENWITZ
BY: Clyde C. Blinn
ATTORNEY.

INVENTOR: FRANK H. W. SCHOENWITZ

BY: Clyde C. Blinn ATTORNEY.

CONTROL AND SUPERVISION SYSTEM HAVING DATA STORAGE

BACKGROUND AND SUMMARY OF THE INVENTION

In control and supervision systems for controlling and supervising the operation of air-conditioning apparatus in a large building, a central station or control panel is connected to control a plurality of remote station apparatus. At the central station, storage apparatus has been provided such as a core memory for storing data associated with the remote stations, whereby upon a message being received from a remote station, the data is removed from the memory apparatus. In such systems, the central station apparatus is quite complicated and expensive as the programming necessary to search the memory apparatus for each message identifying the station to obtain the correct stored data for a particular station is very complex.

The present invention is concerned with a central station having a memory or storage apparatus which is less complex and less expensive. The data or information stored in the memory in tabular form to be associated with particular remote stations is retrieved or obtained from the memory by selectively stepping and/or synchronizing the memory with the reporting messages from each of the plurality of remote stations.

Specifically, when a message is sent from a remote station, a portion or bit of the binary coded message is used to selectively step the memory to the data or information to find its stored location for that particular remote station. The specific stored data for a particular station need not be addressed in the memory.

The present invention is disclosed in the drawing of which:

DESCRIPTION OF THE INVENTION

Figure 1:
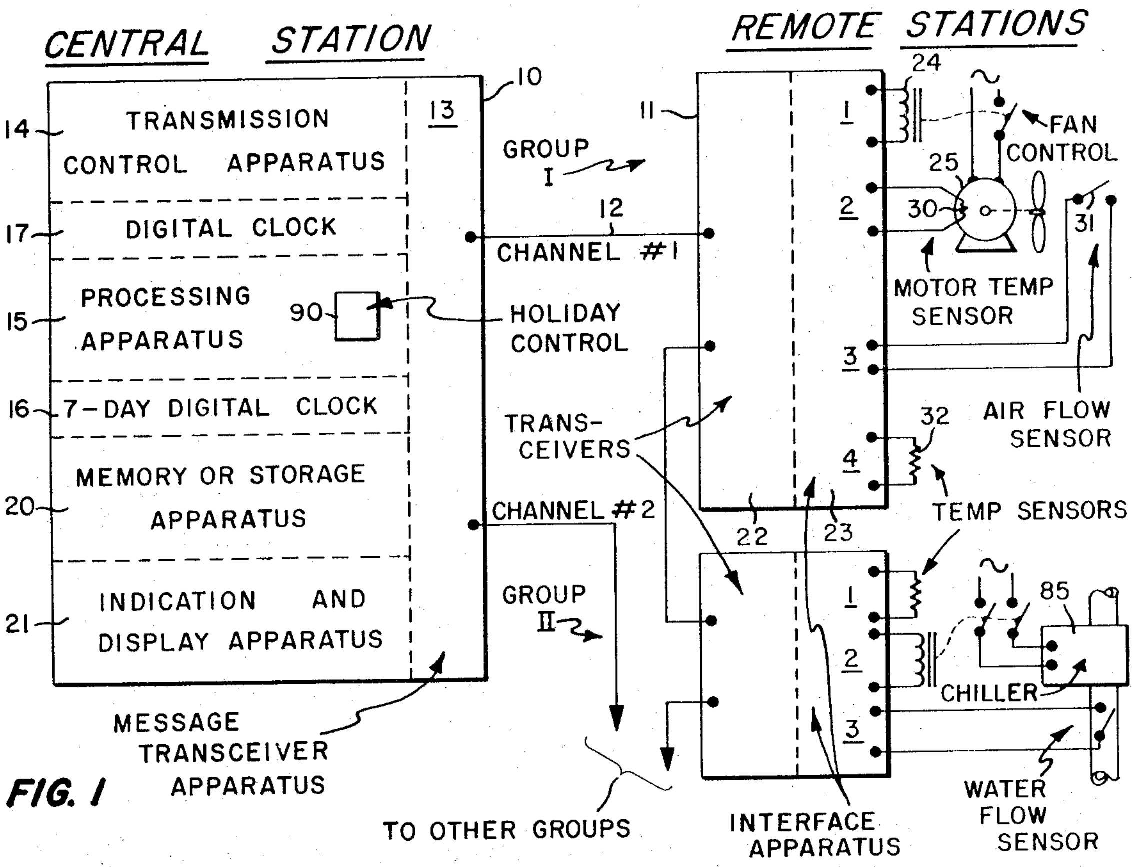
FIG. 1 is a schematic representation of a control system having a central station and a plurality of groups of remote stations.

Referring to FIG. 1 a central station 10 is connected to a plurality of groups of remote stations. Each of the groups has a panel 11 connected to a communication channel 12 for transmitting and receiving messages to and from the central station and remote stations. The particular type of communication system used is no part of the present invention, but for explanation purposes, a communication system using serially transmitted messages made of a plurality of bits in binary form is disclosed similar to that shown in the James R. Berrett et al. application Ser. No. 864,679, filed Oct. 8, 1969.

The central station has a message transceiver apparatus 13 for sending and receiving messages over the communication channel 12 (channel No. 1) and other channels such as channel No. 2 shown to be connected to other groups of remote stations. Transmission control apparatus 14 provides for the operation of the central station to accomplish the various operations associated with the remote stations by sending messages from apparatus 13 over the communication channels to the remote group panels. Processing apparatus 15 processes messages received by the central station. The processing apparatus contains a 7-day digital clock 16 for providing the day (1 to 7) in a 3-bit digital number, and a 24-hour digital clock 17. Memory or storage apparatus 20 stores data associated with the various remote stations. The stored data is in tabular form whereby the memory can be stepped or operated from one data entry to another entry. Indication and display apparatus 21 provides for the display and indication of data and information associated with the remote stations, such as the acknowledgement of a particular remote station temperature-responsive sensor exceeding a predetermined high or low temperature limit.

Each of the groups of remote stations has a panel 11 which contains a message transceiver apparatus 22 for receiving and transmitting messages over the communication channel 12 to the central station and interface apparatus 23 connecting the various remote stations having analogue or digital data outputs associated with that group to transceiver 22. Connected to panel 11 of group I are four stations shown for explanation purposes, but the number and type of apparatus associated with the various remote stations of the group panels 11 may vary with the various types of installations. Group I has a fan control relay 24 connected to station 1 which when energized connects a fan motor 25 to a source of power. Station 2 has a temperature-responsive resistance element or condition sensor 30 for measuring the temperature of the motor. Station 3 has an airflow condition sensor or switch 31 which is closed when the fan motor is energized to provide airflow. Station 4 is another temperature-responsive resistance element 32. Similar apparatus is associated with group II and will be referred to during the operation description.

When a message is sent from the central station to retrieve information from the various remote stations, the information is sent back to the central station by means of a message or data words. Upon the central station receiving a message, a portion of the message is used to selectively step or energize the memory or storage apparatus 20 in the central station. By stepping the tabular memory, the stored data associated with that particular station message is retrieved and used by the central station processing apparatus.

Figure 2:
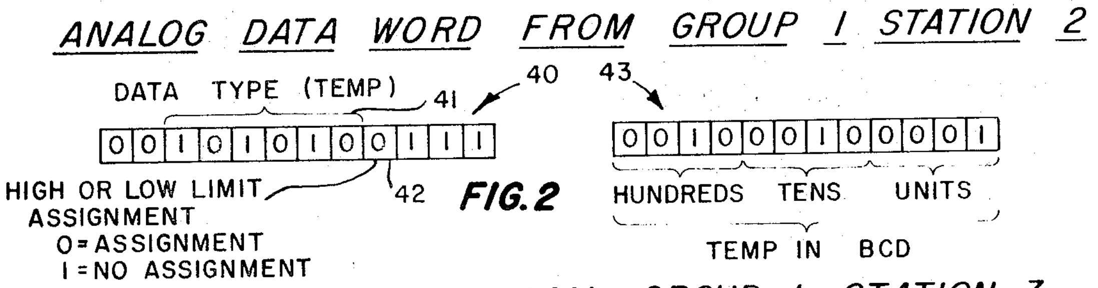
FIGS. 2, 3 and 4 are typical message formats for binary coded messages which are sent between the central station and the remote stations.

Referring to FIG. 2, a typical analogue data word or message from group I station 2 is shown. The message has a first part 40 made of 12 bits in binary form with 6 bits 41 used to identify the data type such as temperature. One portion or a ninth bit 42 of message 40 is used to inform the central station processing apparatus of a memory assignment for the high or low limit of temperature to which the temperature received in the second part 43 of the message will be compared with to determine whether the temperature is within the limit assignment. If bit 42 of a message is a mark (1) the memory contains no data for the station associated with that message. Message 40 has a space (0) for bit 42 thus the memory contains data and is stepped to the next address to obtain data associated with that address.

Figure 3:
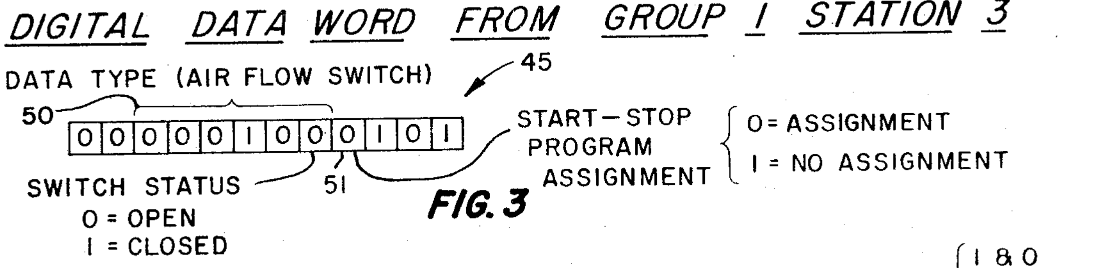

A digital data word or message 45 from group I station 3 is shown in FIG. 3. Message 45 comprises a plurality of bits in binary form having a group of bits 50 identifying the data type; that is, that the data is from an airflow switch, and a portion or ninth bit 51 (as a space or 0) to inform the central station that a start-stop program assignment is stored in the memory apparatus.

Figure 4:
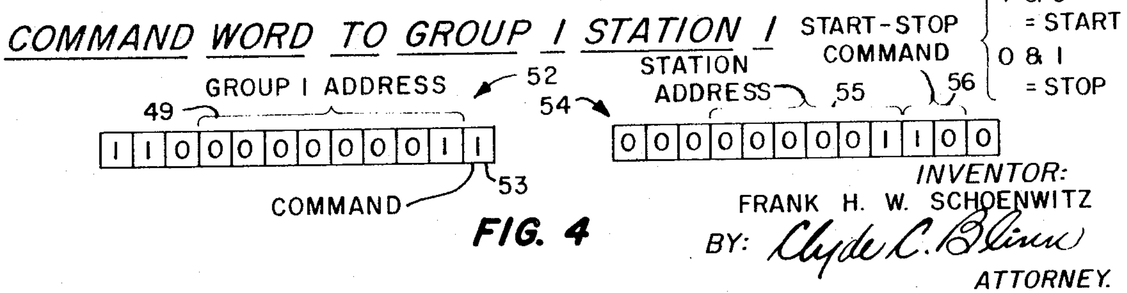

The message or command word of FIG. 4 is a typical message to group I station 1 to start motor 25. The message comprises a first part 52 with the group address 49 in binary form and a bit 53 (a mark or 1) to inform the group that a command message will follow. Part 54 of the message contains the station address 55 and a start command 56.

Figure 6:
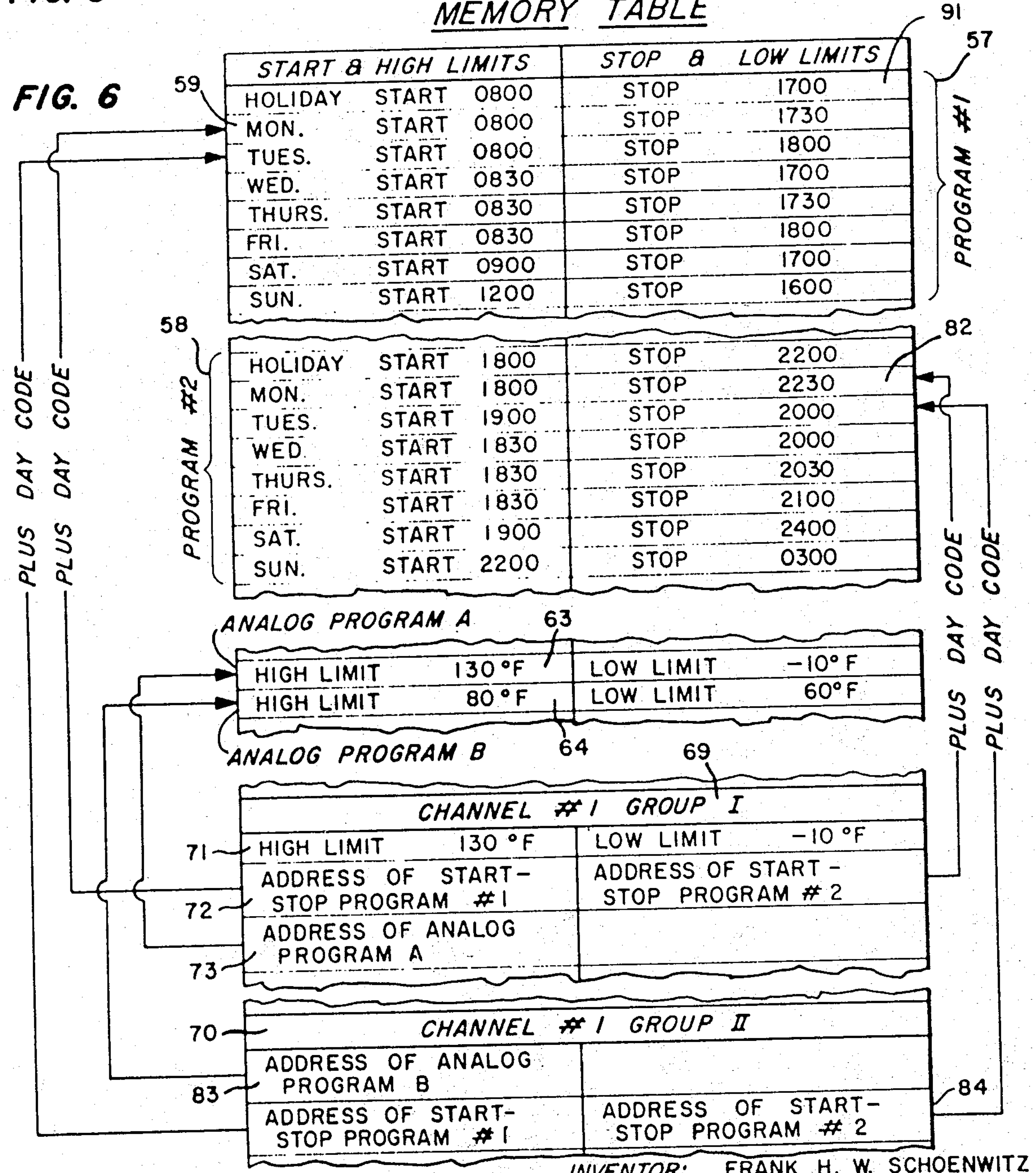
FIG. 6 is a representation of the memory table of the storage apparatus.

A memory table is shown in FIG. 6 to show schematically certain data stored in tabular form in the memory or storage apparatus 20 in the central station. While the data in the memory is stored in coded form, such as, in words comprising a plurality of bits in binary form, the schematic memory table is shown with the data identified. The memory has a large capacity and only a limited showing of the stored data is contained in FIG. 6. The particular showing is for data of high and low temperature limit assignments for temperature sensors and start and stop times for a start-stop program. The start program and high limits are shown in the left column and the stop program and low limits are shown in the right column.

Two start or stop programs No. 1 and No. 2 are shown at 57 and 58 respectively, each having eight entries or locations for a start and stop time, for the 7 days of a week and a holiday. For example, in start-stop program No. 1 the Monday assignment 59 shows a start time of 0800 and a stop time of 1730. While only two start-stop programs No. 1 and No. 2 are shown, depending upon the capacity of the storage apparatus other combinations of start and stop times for different days could be provided.

Also stored in the memory table is program A shown at 63 for a high-limit temperature and a low-limit temperature. A program B is shown at 64 for another high and low alarm limit for temperature.

Listed below each of the addresses 69 and 70 for a channel and group are a plurality of high-low temperature limit assignments or start-stop program assignments which are associated with various stations of that particular group. For example, under the address at 69 for channel No. 1 group I, a first line 71 contains high and low temperature limits, a second line 72 contains an address for a first start-stop program No. 1 and an address for a second start-stop program No. 2, and line 73 has an address for an analogue program A. A similar listing of data is contained under channel No. 1 group II address 70 and data for other groups of remote stations in the system could also be stored in the memory.

OPERATION OF THE INVENTION

Assuming that transmission control apparatus 14 was operated to cause message apparatus 13 to send a message to group I over channel No. 1 to have the various stations of group I to report analogue (temperature) data or digital (switch position) data. Upon receiving the message, transceiver 22 causes interface apparatus 23 to scan the remote stations and to report the conditions of the analogue or digital stations to the central station. As the stations of group I reported in sequence by serially sending messages over channel No. 1 to the central station, the messages are received at the central station to be processed by processing apparatus 15.

As data of temperature limits or time program is stored in the memory 20, as each reporting message is received by processing apparatus 15, any data in the memory associated with the station from which the message originated is applied to the incoming data of the reporting message. While some stations may not have information stored in the memory, processing apparatus 15 is informed that there is data in the memory by means of the state of the ninth bit of the analogue data message or digital data message.

When the first reporting message of a group is received by processing apparatus 15 and the reporting message has a space in the ninth bit, processing apparatus 15 scans the memory for the address of that particular group on that particular channel to find a table of stored data correlated or associated with the stations of that group. Upon finding the table, the first line of tabular data under the channel and group address is applied to the first mentioned reporting data message.

For example, assuming that the analogue data message shown in FIG. 2 is the first message to be received from group I over channel 1 of the system of FIG. 1. Upon processing apparatus 15 detecting the space in the ninth bit of message 40, the processing apparatus scans the memory to look for the address of the table for channel 1 group I which is shown in the line at 69 in FIG. 6. The first entry or location in that table, the line at 71 is used as the stored temperature limits for the data associated with the first-mentioned reporting message. The reported data which is contained in the second portion 43 of the message, shown in FIG. 2, is interpreted as 221° and when compared with the high and low temperature limits of line at 71 in the memory, the temperature exceeds the high limit of 130° F. and processing apparatus 15 indicates the fact that the temperature of station 2 of group I exceeded the temperature limit by an appropriate indication on apparatus 21.

As the message from station 3 group I as received by processing apparatus 15, the message is processed in a similar manner; however, station 3 is a switch to have a digital data message as shown in FIG. 3. As this message is from the same group, processing apparatus 15 upon receiving the ninth bit of the message 45 which indicates that a start-stop program assignment is in the memory, steps the memory downward to use another entry of the tabular memory data at 72 in FIG. 6. As the line at 72 of the memory contains an address for a start-stop program, the processing apparatus looks for that address in another part of the memory. As the address of the group is retrieved in the storage each time a station of the group reports with a space in the ninth bit, the system is synchronized with the memory.

Figure 5:
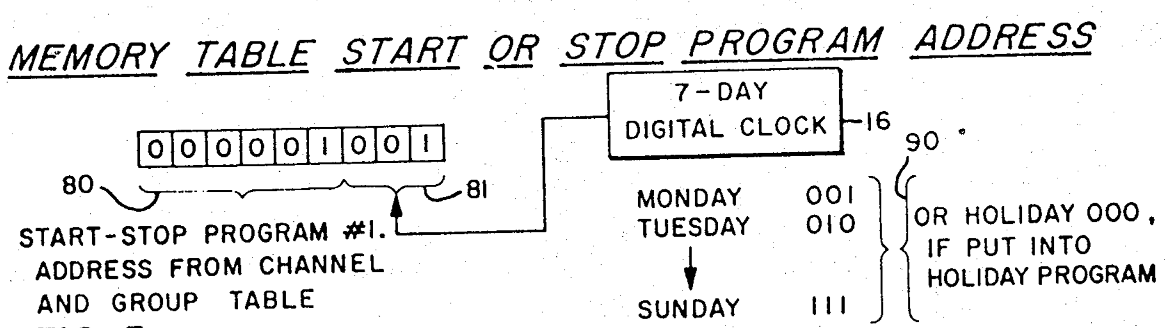
FIG. 5 is a typical address for use in retrieving information from the memory table.

Specifically the program address in line at 72 comprises a six-bit address 80 in binary form as shown in FIG. 5. To find the proper start-stop program in the memory table, three additional bits are added to the program address by the output of the 7-day digital clock 16 contained in the processing apparatus 15 of FIG. 1. Assuming that the day was Monday, the clock output is 001. When the three-bit portion 81 is added to the first portion 80 of the program address shown in FIG. 5 to provide special address, processing apparatus 15 then addresses the memory for the particular start-stop program having that special address. As shown in FIG. 6, the program for the special address as shown in FIG. 5 is on line at 59 to have a start time of 0800 and a stop time of 1730. When the processing apparatus compared the present time with the start time on line at 59 of the memory, if the present time was 0800, processing apparatus 15 sends an appropriate message to the group I to start the motor.

After comparing the start time, the processing apparatus will compare the present time with the stop time on line at 59 of the memory. If the present time was 1730, processing apparatus 15 sends an appropriate message to group I to stop the motor.

A typical command word message for starting the motor is shown in FIG. 4 having the first portion 52 with the group I address and the second portion 54 with the station address to direct the start command message 56 to station 1 of group I to start the motor. If the present digital time was less than 0800, the processing apparatus would do nothing as the motor was not to be started until 8:00 a.m.; however, upon a subsequent scanning operation of the stations of group I at 8:00, the motor would be started.

For the digital data word from station 3 of group I, the start-stop program of the line at 72 is used. The line at 72 contains the address for a second start-stop program 2 which is a similar six-bit address to which the 7-day digital clock output would be added for Monday to refer to the start-stop program of the line at 82 in FIG. 6. Each start-stop point can be controlled by up to two independent start-stop programs.

Upon the processing apparatus receiving an analogue data message from group I for station 4 which would be similar to the message shown in FIG. 2, if the ninth bit of the message indicated that an assignment in the memory should be applied to this message, processing apparatus 15 would step the memory down to apply the analogue program address shown in line at 73 of FIG. 6. The processing apparatus takes this address and readdresses the memory for program A which is shown on the line at 63 having a high limit of 130° F. and a low limit of −10° F. Processing apparatus would apply these temperature limits to the temperature reported in the analogue data message from station 4 of group I and if the temperature was out of the limits an appropriate indication on apparatus 21 would be given.

Similarly, when stations 1 and 3 of group II reported by analogue and digital data messages, if the alarm limits shown under the address at 70 in FIG. 6 were to be applied, the reporting message would have a space in the ninth bit of the message. Once the processing apparatus found the table under the channel No. 1 group II address at 70, the memory is stepped down to the line at 83 which is the address of analogue program B. The address at 83 refers to the analogue program B at line 64, which contains a high limit of 80° F. and a low limit of 60° F. which in turn will be applied to the temperature reported in the analogue message from stations 1 of group II. The start-stop programs of the line at 84 will be applied to the digital data reported from station 3. Upon the memory being stepped downward to the line at 84, the start-stop program No. 1 for the particular day and the start-stop program No. 2 for the particular day is applied to the station 3 to send out an appropriate command word message to start or stop chiller apparatus 85 associated with station 2 of group II.

Upon the operation of a holiday control 90 associated with processing apparatus 15 of the central station, the 7-day digital clock 16 is deactivated and the addition of the three bits 81 to the program address shown in FIG. 5 is replaced by 000 as a holiday address. Using the memory table start-stop program, address made up of the six-bit portion 80 obtained from the memory table and the three-bit portion 81 having the holiday address 000, the holiday address associated with the programs would be available. For example, using the start-stop program No. 1 address shown at 80 in FIG. 5 with the holiday (000) address 81, the start-stop program on the line at 91 of FIG. 6 is used to provide a start time of 0800 and a stop time of 1700. With the holiday control 90 actuated, the holiday address is used until it is deactivated to return to the use of the 7-day digital clock address.

The embodiments of the invention in which an exclusive property or right is claimed are defined as follows:

1. In a control system comprising:

a central station comprising, first message transceiver apparatus for receiving and transmitting messages, processing apparatus connected to said transceiver apparatus, storage apparatus associated with said processing apparatus for storing data in a plurality of data locations, said storage apparatus being adapted to be operated sequentially from one data location to another data location of said plurality of data locations, a plurality of groups of remote condition-responsive stations connected to said central station, at least one of said groups comprising:

second message transceiver apparatus for receiving and transmitting messages, a plurality of stations, and means connecting said stations to said second message apparatus to sequentially send messages to said central station reporting the condition of each of said stations in a predetermined order, said messages comprising a portion to selectively operate said storage apparatus, when said message is for one station having data stored in said storage apparatus, from said one data location to said another data location to selectively use stored data of said another location in the processing by said processing apparatus of said condition reported from said one station.

2. The invention of claim 1 wherein, said storage apparatus has data stored in tabular form whereby the data in said one location is used and then the data in said another location is used, said potion of said messages of said second message apparatus is a bit in a particular form whereby upon said processing apparatus receiving a message and said bit in said particular form, said storage apparatus is operated to said another location to use the stored data of said another location with said message.

3. The invention of claim 2, wherein, said data stored in said another location is an address for data stored in a third location of said storage.

4. The invention of claim 3 wherein, said data stored in said third location of said memory is listed under a special address for each day of the week, and comprising;

first means for adding to said address of said stored data the day of the week to provide said special address to obtain data for a particular day.

5. In the invention of claim 5 comprising, override means for said first means whereby said special address can be fixed to provide a holiday program address.

6. The invention of claim 1 wherein, upon said processing apparatus receiving a message from said second message apparatus indicative of a condition of a particular station with said portion to operate said storage apparatus to said another location, said processing apparatus refers to said stored data of said another location associated with said particular station for processing said condition.

7. The invention of claim 1 wherein, said storage means has data associated with predetermined remote stations stored in said one data location and said another data location, and said portion of said message from a particular station upon being detected by said processing apparatus operates said storage means from said one location to said another location to use said data of said another location to process said message of said particular station.

8. The invention of claim 1 wherein, said storage means contains a plurality of data locations for the stations of each of said plurality of groups correlated with the address of each of said groups, said processing apparatus upon receiving a first message from said second message apparatus of one of said groups having said portion operates said storage apparatus to use said first data location in said storage apparatus under said one group address to thereby synchronize said system with said locations of said storage apparatus.

9. The invention of claim 1, wherein, at least one of said remote condition-responsive stations has an analogue data output and said storage apparatus has stored in said one data location limiting data for said analogue data station.

10. The invention of claim 1 wherein, at least one of said condition-responsive stations has a digital output and said storage apparatus has the desired condition of said one digital station stored in one data location.

* * * * *